US010672382B2

(12) United States Patent
Weng et al.

(10) Patent No.: US 10,672,382 B2
(45) Date of Patent: Jun. 2, 2020

(54) INPUT-FEEDING ARCHITECTURE FOR ATTENTION BASED END-TO-END SPEECH RECOGNITION

(71) Applicant: TENCENT AMERICA LLC, Palo Alto, CA (US)

(72) Inventors: Chao Weng, Fremont, CA (US); Jia Cui, Bellevue, WA (US); Guangsen Wang, Shenzhen (CN); Jun Wang, Shenzhen (CN); Chengzhu Yu, Bellevue, WA (US); Dan Su, Shenzhen (CN); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 75 days.

(21) Appl. No.: 16/160,352

(22) Filed: Oct. 15, 2018

(65) Prior Publication Data

US 2020/0118547 A1   Apr. 16, 2020

(51) Int. Cl.
    *G10L 15/06*    (2013.01)
    *G10L 15/14*    (2006.01)
    *G10L 15/183*   (2013.01)
    *G10L 15/22*    (2006.01)

(52) U.S. Cl.
    CPC ............ *G10L 15/063* (2013.01); *G10L 15/22* (2013.01)

(58) Field of Classification Search
    CPC .......... G10L 15/00; G10L 15/06; G10L 15/14
    See application file for complete search history.

(56) References Cited

U.S. PATENT DOCUMENTS

| 10,380,236 | B1* | 8/2019 | Ganu | G06F 40/126 |
| 2003/0050786 | A1* | 3/2003 | Jax | G10L 21/038 |
| | | | | 704/500 |
| 2014/0149112 | A1* | 5/2014 | Kalinli-Akbacak | G10L 25/03 |
| | | | | 704/232 |
| 2016/0092766 | A1* | 3/2016 | Sainath | G10L 25/30 |
| | | | | 706/20 |
| 2017/0148433 | A1* | 5/2017 | Catanzaro | G10L 15/02 |
| 2017/0270919 | A1* | 9/2017 | Parthasarathi | G10L 15/02 |

(Continued)

OTHER PUBLICATIONS

Written Opinion of the International Searching Authority issued in International Application No. PCT/US19/38437, dated Sep. 11, 2019.

(Continued)

*Primary Examiner* — Shreyans A Patel
(74) *Attorney, Agent, or Firm* — Sughrue Mion, PLLC

(57) ABSTRACT

Methods and apparatuses are provided for performing end-to-end speech recognition training performed by at least one processor. The method includes receiving, by the at least one processor, one or more input speech frames, generating, by the at least one processor, a sequence of encoder hidden states by transforming the input speech frames, computing, by the at least one processor, attention weights based on each of the sequence of encoder hidden states and a current decoder hidden state, performing, by the at least one processor, a decoding operation based on a previous embedded label prediction information and a previous attentional hidden state information generated based on the attention weights; and generating a current embedded label prediction information based on a result of the decoding operation and the attention weights.

20 Claims, 4 Drawing Sheets

(56) References Cited

U.S. PATENT DOCUMENTS

| | | | |
|---|---|---|---|
| 2018/0060727 A1* | 3/2018 | Rainwater | G06N 3/0445 |
| 2018/0121787 A1* | 5/2018 | Hashimoto | G06N 3/0445 |
| 2018/0165288 A1* | 6/2018 | Chang | G06F 16/93 |
| 2018/0204120 A1* | 7/2018 | Rei | G06N 3/0445 |
| 2018/0300400 A1* | 10/2018 | Paulus | G06F 40/58 |
| 2018/0329883 A1* | 11/2018 | Leidner | G06F 40/117 |
| 2019/0278378 A1* | 9/2019 | Yan | G06N 3/08 |
| 2019/0279614 A1* | 9/2019 | Ye | G10L 15/16 |
| 2019/0287012 A1* | 9/2019 | Celikyilmaz | G06F 16/345 |
| 2020/0034435 A1* | 1/2020 | Norouzi | G06F 40/58 |

OTHER PUBLICATIONS

International Search Report issued in International Application No. PCT/US19/38437, dated Sep. 11, 2019.
Jan Chorowski et al. "Attention-Based Models for Speech Recognition" Jun. 24, 2015.
George E. Dahl et al. "Context-Dependent Pre-Trained Deep Neural Networks for Large-Vocabulary Speech Recognition" IEEE Transactions on audio, speech, and language processing, vol. 20, No. 1 Jan. 2012.

* cited by examiner

INPUT-FEEDING ARCHITECTURE FOR ATTENTION BASED END-TO-END SPEECH RECOGNITION

BACKGROUND

1. Field

The present disclosure relates to methods and apparatuses for performing end-to-end speech recognition, particularly, an input feeding architecture that improves the performance of an end-to-end speech recognition system.

2. Description of the Related Art

Related art end-to-end speech recognition systems can be categorized into a connectionist temporal classification (CTC) based system and an attention based system. The related art attention based end-to-end speech recognition system, namely listen, attend and spell (LAS) architecture, is illustrated in FIG. 4 of the disclosure. The LAS architecture was examined on a large-scale speech task and showed a superior performance to a related art hybrid system, which is a hybrid between a pre-trained, deep neural network (DNN) and a context-dependent (CD) hidden Markov model.

In the LAS architecture illustrated in FIG. 4, the inputs are embedded prediction $y_{i-1}$ and context vector $c_{i-1}$. The context vector $c_{i-1}$ contains all encoder hidden state information from the last step, whereas the embedded prediction $y_{i-1}$ only contains the label information with highest probability from the last step instead of the full decoder attentional hidden state information.

SUMMARY

Provided are methods and apparatuses that improve the related art LAS speech recognition system by implementing an input-feeding architecture.

According to an aspect of the present disclosure, there is provided a method of performing end-to-end speech recognition training performed by at least one processor, the method comprising: receiving, by the at least one processor, one or more input speech frames; generating, by the at least one processor, a sequence of encoder hidden states by transforming the input speech frames; generating, by the at least one processor, a current hidden state of a decoder by performing a decoding operation based on a previous embedded label prediction information and a previous attentional hidden state information; generating, by the at least one processor, context vectors by computing attention weights based on each of the sequence of encoder hidden states and the current hidden state of the decoder; generating, by the at least one processor, a current attentional hidden state based on the context vector and the current hidden state of the decoder; and generating, by the at least one processor, an output sequence based on the attentional hidden state.

The output sequence may be a current label prediction information generated by performing a projection and softmax operation based on the attentional hidden state.

The computing the attention weights may further comprise calculating a compatibility score, which represents alignment between the current decoder hidden state and each of the encoded hidden states.

The computing the attention weights may be calculated by the following equation:

$$a_{t,i} = \mathrm{align}(h_i^{dec}, h^{enc}) = \frac{\exp(\mathrm{score}(h_i^{dec}, h_t^{enc}))}{\sum_{t'=1}^{T} \exp(\mathrm{score}(h_i^{dec}, h_{t'}^{enc}))}.$$

The $\mathrm{score}(h_i^{dec}, h_t^{enc}) = v_a^{t_o} \tanh(W_a[h_i^{dec}; h_t^{enc}])$, and where [a;b] denotes concatenation of two vectors.

The context vector $c_i$ is calculated based on a weighted sum of the sequence of encoder hidden states as follows:

$$c_i = \sum_{t=1}^{T} a_{t,i} h_t^{enc}.$$

The current attentional hidden state $h'_i{}^{dec}$ is obtained as follows: $h'_i{}^{dec} = \tanh(W_h[c_i; h_i^{dec}])$.

According to another aspect of the disclosure, there is provided an end-to-end speech recognition training apparatus comprising: at least one memory operable to store program code; and at least one processor operable to read said program code and operate as instructed by said program code, said program code comprising: receive one or more input speech frames; generate a sequence of encoder hidden states by transforming the input speech frames; generate a current hidden state of a decoder by perform a decoding operation based on a previous embedded label prediction information and a previous attentional hidden state information; generate context vectors by computing attention weights based on each of the sequence of encoder hidden states and the current hidden state of the decoder; generate a current attentional hidden state based on the context vector and the current hidden state of the decoder; and generate an output sequence based on the attentional hidden state.

The output sequence may be a current label prediction information generated by performing a projection and softmax operation based on the attentional hidden state.

The computing the attention weights may further comprise calculating a compatibility score, which represents alignment between the current decoder hidden state and each of the encoded hidden states.

The computing the attention weights may be calculated by the following equation:

$$a_{t,i} = \mathrm{align}(h_i^{dec}, h^{enc}) = \frac{\exp(\mathrm{score}(h_i^{dec}, h_t^{enc}))}{\sum_{t'=1}^{T} \exp(\mathrm{score}(h_i^{dec}, h_{t'}^{enc}))}.$$

The $\mathrm{score}(h_i^{dec}, h_t^{enc}) = v_a^{t_o} \tanh(W_a[h_i^{dec}; h_t^{enc}])$, and where [a;b] denotes concatenation of two vectors.

The context vector $c_i$ is calculated based on a weighted sum of the sequence of encoder hidden states as follows:

$$c_i = \sum_{t=1}^{T} a_{t,i} h_t^{enc}.$$

The current attentional hidden state $h'_i{}^{dec}$ is obtained as follows: $h'_i{}^{dec} = \tanh(W_h[c_i; h_i^{dec}])$.

According to another aspect of the disclosure, there is provided a non-transitory computer readable medium having stored thereon program codes for causing at least one processor to perform a method comprising: receiving, by the at least one processor, one or more input speech frames; generating, by the at least one processor, a sequence of encoder hidden states by transforming the input speech frames; generating, by the at least one processor, a current hidden state of a decoder by perform a decoding operation based on a previous embedded label prediction information and a previous attentional hidden state information; generating, by the at least one processor, context vectors by computing attention weights based on each of the sequence of encoder hidden states and the current hidden state of the decoder; generating, by the at least one processor, a current attentional hidden state based on the context vector and the current hidden state of the decoder; and generating, by the at least one processor, an output sequence based on the attentional hidden state.

The output sequence may be a current label prediction information generated by performing a projection and softmax operation based on the attentional hidden state.

The computing the attention weights may further comprise calculating a compatibility score, which represents alignment between the current decoder hidden state and each of the encoded hidden states.

The computing the attention weights may be calculated by the following equation:

$$a_{t,i} = \text{align}(h_i^{dec}, h^{enc}) = \frac{\exp(\text{score}(h_i^{dec}, h_t^{enc}))}{\sum_{t'=1}^{T} \exp(\text{score}(h_i^{dec}, h_{t'}^{enc}))}.$$

The score$(h_i^{dec}, h_t^{enc}) = v_a^{T} \circ \tanh(W_a[h_i^{dec}; h_t^{enc}])$, and where [a;b] denotes concatenation of two vectors.

The context vector $c_i$ is calculated based on a weighted sum of the sequence of encoder hidden states as follows:

$$c_i = \sum_{t=1}^{T} a_{t,i} h_t^{enc}.$$

The current attentional hidden state $h'_i{}^{dec}$ is obtained as follows: $h'_i{}^{dec} = \tanh(W_h[c_i; h_i^{dec}])$.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
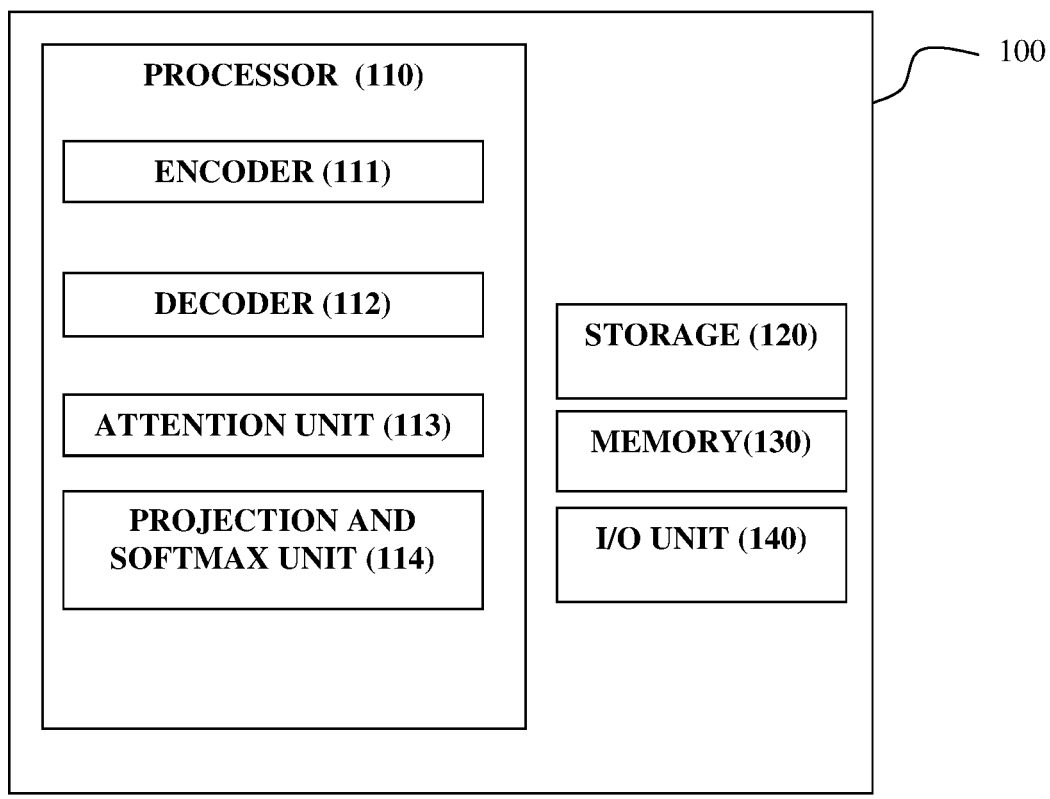
FIG. 1 is an apparatus implementing the input feeding architecture for end-to-end speech recognition training according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, end-to-end processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

FIG. 1 is a block diagram illustrating an end-to-end speech recognition system with input feeding architecture according to an embodiment. The end-to-end speech recognition system 100 may include a processor 110, storage 120, memory 130 and I/O unit 140. According to an embodiment, the processor 110 may include an encoder 111, a decoder 112, an attention unit 113 and a projection and softmax unit 114.

Compared to related art LAS speech recognition system, the end-to-end speech recognition system 100 provides improved speech recognition performance. For instance, the end-to-end speech recognition system 100 achieves improvement in word error rates over the related art LAS speech recognition system by providing the input feeding architecture of the present disclosure.

According to an embodiment, one or more of the encoder 111, the decoder 112, the attention unit 113 and the projection and softmax unit 114 maybe implemented by one or more processors. According to an embodiment, the encoder 111, the decoder 112, the attention unit 113 and the projection and softmax unit 114 maybe provided as separate units.

Figure 2:
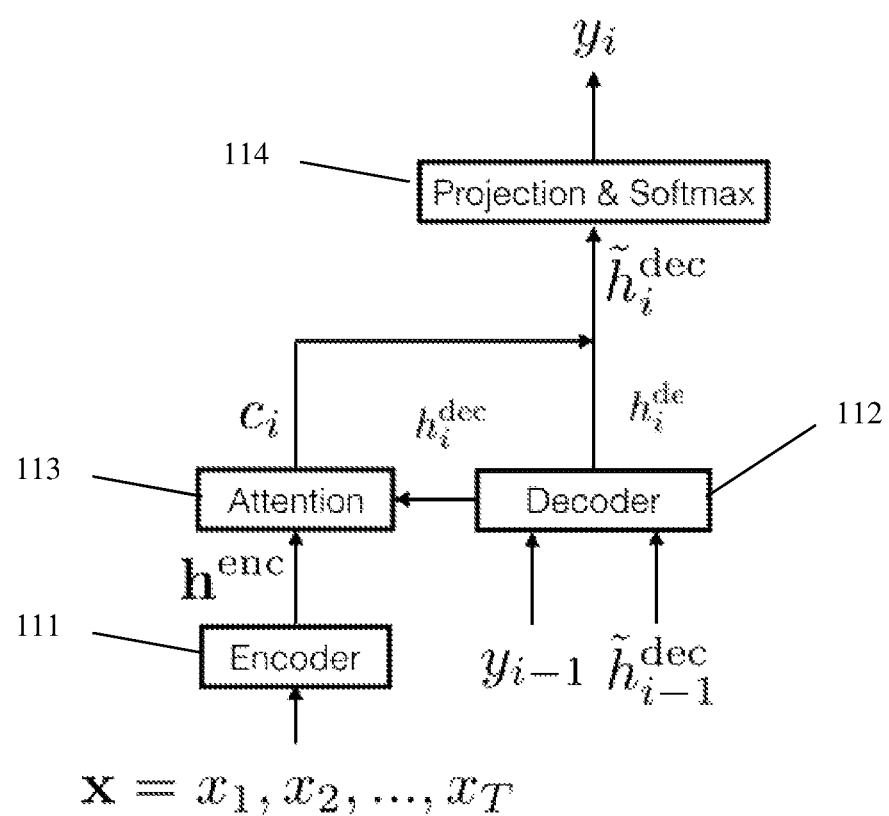
FIG. 2 is a diagram illustrating the input feeding architecture according to an embodiment.

FIG. 2 illustrates input feeding architecture according to an embodiment. According to an embodiment, the encoder 111 transforms T input speech frames $x = x_1, x_2, \ldots, x_T$, into $h^{enc}$, a sequence of hidden states with the length T which can be treated as a high-level representation of the inputs:

$$h^{enc} = h_1^{enc}, h_2^{enc}, \ldots, h_t^{enc}, \ldots, h_T^{enc} = \text{Encoder}(x_1, x_2, \ldots, x_t, \ldots, x_T) \quad (1)$$

According to an embodiment, the inputs are typically several hundred frames of speech features such as log-mel filterbanks or Mel-frequency cepstral coefficients (MFCCs), widely used features in speech recognition systems extracted from the input speech signal.

The attention unit 113 takes as inputs all encoder hidden states $h^{enc}$ and the current decoder hidden state $h_i^{dec}$. Based on a compatibility score between the current decoder hidden state $h_i^{dec}$ and each encoded hidden state $h_t^{enc}$, the attention unit 113 computes the attention weights as follows:

$$a_{t,i} = \text{align}(h_i^{dec}, h^{enc}) = \frac{\exp(\text{score}(h_i^{dec}, h_t^{enc}))}{\sum_{t'=1}^{T} \exp(\text{score}(h_i^{dec}, h_{t'}^{enc}))}. \quad (2)$$

According to an embodiment, the attention weights represent the alignment between input and output. Moreover, depending on different compatibility score functions in use, the attention unit 113 can be categorized into dot-product, MLP and general. For instance, for an MLP based attention, the compatibility score is computed as:

$$\text{score}(h_i^{dec}, h_t^{enc}) = v_a^T \tanh(W_a[h_i^{dec}; h_t^{enc}]), \quad (3)$$

where [a;b] denotes the concatenation of two vectors. The output of the attention unit 113 is a context vector $c_i$ calculated via a weighted sum of the encoder hidden states which can be interpreted as a summary of all encoder hidden state information used in the current prediction:

$$c_i = \sum_{t=1}^{T} a_{t,i} h_t^{enc}. \quad (4)$$

The decoder 112 takes the previous embedded label prediction $y_{i-1}$ and previous attentional hidden state, $h_{i-1}^{dec}$ as inputs and outputs the current hidden state of the decoder $h_i^{dec}$:

$$h_i^{dec} = \text{Decoder}(y_{i-1}, h'_{i-1}^{dec}). \quad (5)$$

According to an embodiment, $h_i^{dec}$ is first used by the attention unit 113 to calculate the context vector $c_i$. Thereafter, the current attentional hidden state $h'_i^{dec}$ is obtained using the calculated context vector $c_i$ and the current hidden state of the decoder $h_i^{dec}$ as follows:

$$h'_i^{dec} = \tanh(W_h[c_i; h_i^{dec}]), \quad (6)$$

where [a;b] is the concatenation operation.

That is, the context vector $c_1$ and the current hidden state of the decoder $h_i^{dec}$ are first concatenated and pass into a linear transform $W_h$ and a nonlinear transform $\tanh(\ )$ before being input into the projection and softmax 114.

Finally, the projection and softmax unit 114 generates the distribution of current label outputs based on the current attentional hidden state $h'_i^{dec}$ as follows:

$$p(y_i | y_{1:i-1}, x) = \text{softmax}(W_o h'_i^{dec}). \quad (7)$$

Figure 3:
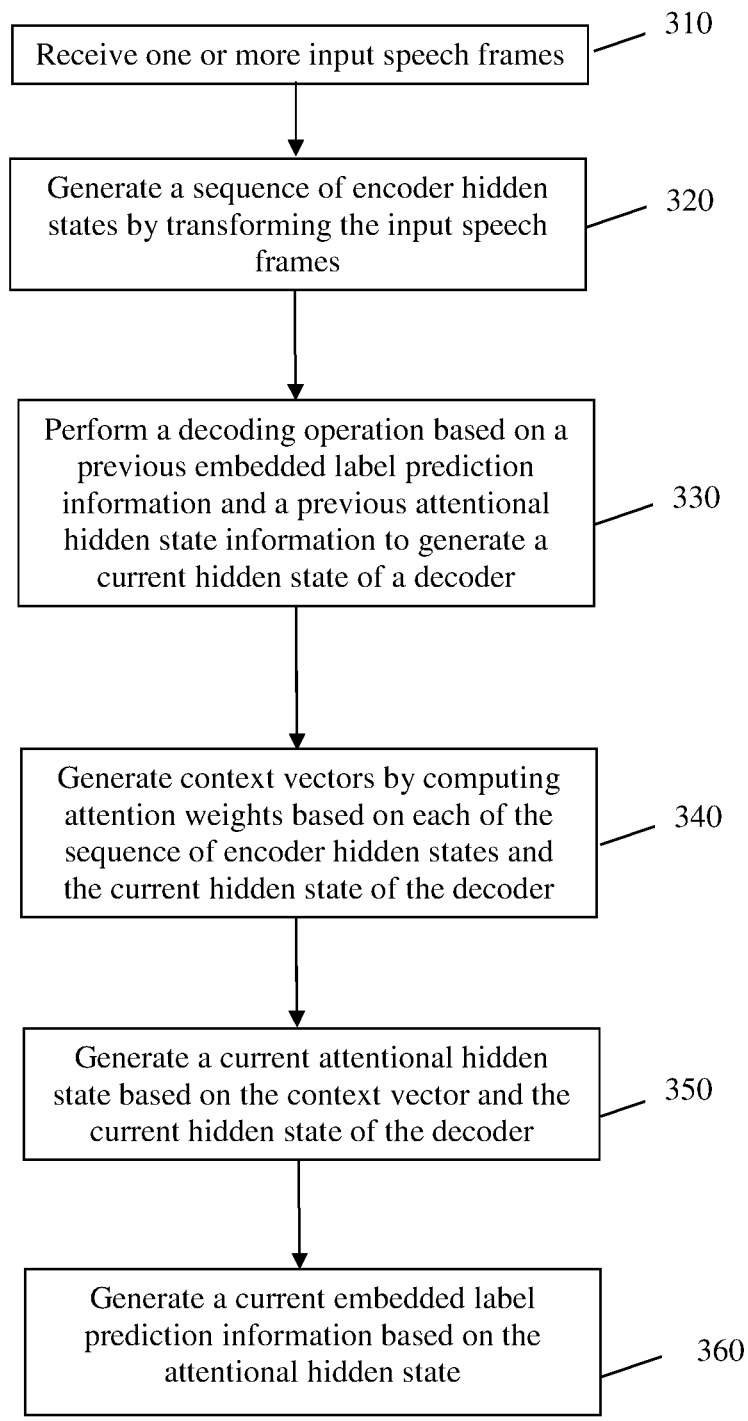
FIG. 3 is a flowchart illustrating operations of the input feeding architecture according to an embodiment.
Figure 4:
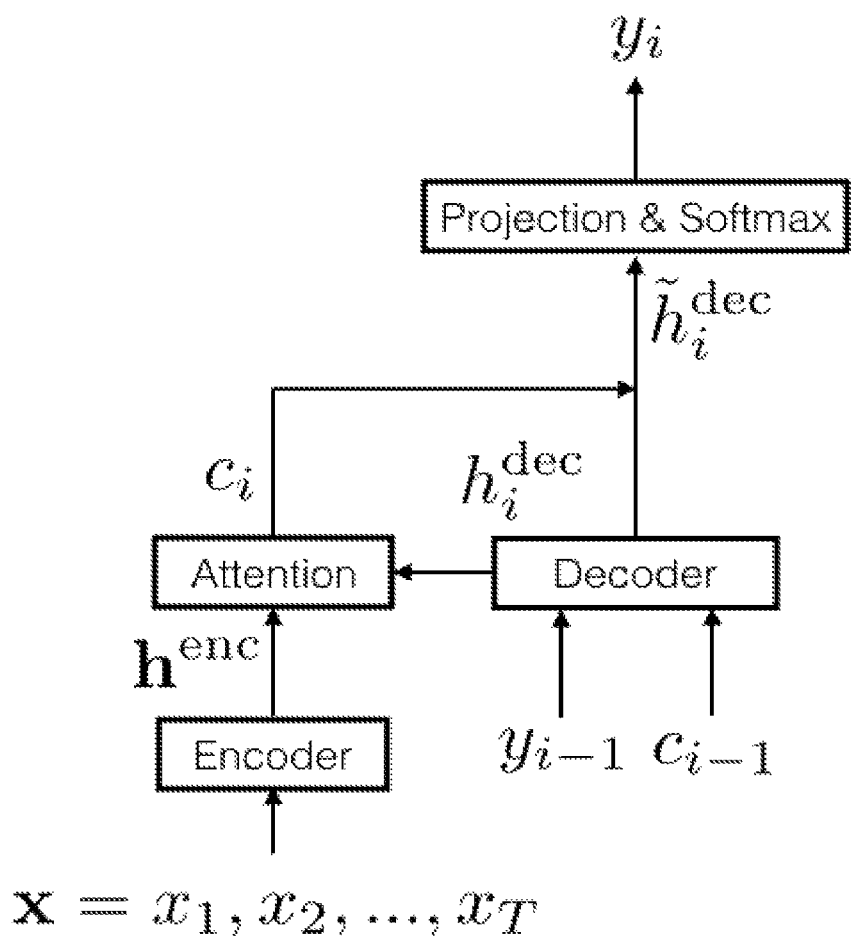
FIG. 4 is a diagram illustrating a related art LAS training system.

FIG. 3 is a flowchart illustrating operations of the input curriculum training unit 312 according to an embodiment.

At 310, a processor may receive one or more input speech frames $x = x_1, x_2, \ldots, x_T$ to perform end-to-end speech recognition training.

At 320, the processor may generate a sequence of encoder hidden states by transforming the input speech frames. According to an embodiment, the processor transforms T input speech frames $x = x_1, x_2, \ldots, x_T$, into $h^{enc}$, a sequence of hidden states with the length T which can be treated as a high-level representation of the inputs: $h^{enc} = h_1^{enc}, h_2^{enc}, \ldots, h_t^{enc}, \ldots, h_T^{enc} = \text{Encoder}(x_1, x_2, \ldots, x_t, \ldots, x_T)$.

At 330, the processor may perform a decoding operation based on a previous embedded label prediction information and a previous attentional hidden state information to generate a current hidden state of a decoder.

At 340, the processor may generate context vectors by computing attention weights based on each of the sequence of encoder hidden states and the current hidden state of the decoder. According to an embodiment, the attention weights represent the alignment between input and output. Further, the attention weights are calculated as follows:

$$a_{t,i} = \text{align}(h_i^{dec}, h^{enc}) = \frac{\exp(\text{score}(h_i^{dec}, h_t^{enc}))}{\sum_{t'=1}^{T} \exp(\text{score}(h_i^{dec}, h_{t'}^{enc}))}.$$

According to an embodiment, for MLP based attention, the compatibility score is computed as:

$$\text{score}(h_i^{dec}, h_t^{enc}) = v_a^T \tanh(W_a[h_i^{dec}; h_t^{enc}]),$$

where [a;b] denotes the concatenation of two vectors.

At 350, the processor may generate a current attentional hidden state based on the context vector and the current hidden state of the decoder.

According to an embodiment, the current hidden state of the decoded $h_i^{dec}$ is first used to calculate the context $c_i$. Thereafter, the current attentional hidden state $h'_i^{dec}$ is obtained using the calculated context vector $c_i$ and the current hidden state of the decoder $h_i^{dec}$ as follows:

$$h'_i^{dec} = \tanh(W_h[c_i; h_i^{dec}]),$$

where [a;b] is the concatenation operation.

That is, the context vector $c_i$ and the current hidden state of the decoder $h_i^{dec}$ are first concatenated and pass into a linear transform $W_h$ and a nonlinear transform $\tanh(\ )$ before being input into the projection and softmax 114.

Finally, at 360, the processor may generate a current embedded label prediction information based on the current attentional hidden state $h'_i^{dec}$ as follows:

$$p(y_i | y_{1:i-1}, x) = \text{softmax}(W_o h'_i^{dec}).$$

The units described herein may be implemented using hardware components and software components. For example, the hardware components may include microphones, amplifiers, band-pass filters, audio to digital converters, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, hardware circuitry or any other device capable of responding to and executing instructions in a defined manner. The processing device also may access, store, manipulate, process, and create data in response to execution of the software.

The software may include a computer program, a piece of code, an instruction, or some combination thereof, to independently or collectively instruct or configure the processing device to operate as desired. The method according to the above-described example embodiments may be recorded in non-transitory computer-readable media including program instructions to implement various operations of the above-described example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Experimental Results

The end-to-end speech recognition system 100 according to an embodiment significantly improves speech recognition performance in terms of word error rate (WER) compared to related art LAS systems as shown in the comparison tables 1 and 2 below.

For instance, the method is compared against the related LAS architecture, on two most widely used benchmarks for English conversational speech recognition, Switchboard-300 hrs and Switchboard+Fisher-2000 hrs. For both methods, the following configurations are used for comparisons:

(1) 40-dimensional log-mel filterbanks, the central frame are spliced with left 5 plus right 3 frames (2) the targets are a set of 49 characters which contains English letters, numbers, punctuations, special transcribed notations in Switchboard including '[laughter]', '[noise]', '[vocalized-noise]' plus '(space)', '(SOS)', '(EOS)' which are used as the indicators for the word boundary, start and end of the sequence (3) 6-layer stacked bidirectional and two-layer unidirectional LSTMs are used for the encoder and decoder, both with 512 hidden units. MLP based attention unit is adopted in the experiments (4) Adam optimization algorithm is used for all experiments where $\beta_1=0.9$, $\beta_2=0.999$, $\varepsilon=10^{-8}$. The initial learning rate is 0.001 and is halved once the improvement on the validation set is saturating.

(5) The performances are evaluated on two standard test set, Eval2000-Switchboard and Eval2000

The experimental results are shown in Table 1 and Table 2 which demonstrate with the input feeding architecture of the present disclosure, the performances of speech recognition are consistently better than the ones with the conventional LAS architecture.

TABLE 1

Experimental Results on Switchboard-300 hrs benchmark

| Methods | WERs(%) | |
| --- | --- | --- |
| | Eval2000-Switchboard | Eval2000 |
| LAS | 15.1 | 20.7 |
| current | 14.4 | 20.2 |

TABLE 2

Experimental Results on Switchboard + 2000 hrs benchmark

| Methods | WERs(%) | |
| --- | --- | --- |
| | Eval2000-Switchboard | Eval2000 |
| LAS | 10.8 | 15.2 |
| current | 9.3 | 13.3 |

The present disclosure has been described above with reference to embodiments. However, those of ordinary skill in the art will understand that various changes in form and details may be made therein without departing from the spirit and scope of the present disclosure as defined by the appended claims. Therefore, the above embodiments should be considered in descriptive sense only and not for purposes of limitation. Thus, the scope of the present disclosure may be defined not by the above detailed descriptions but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of performing end-to-end speech recognition training performed by at least one processor, the method comprising:
   receiving, by the at least one processor, one or more input speech frames;
   generating, by the at least one processor, a sequence of encoder hidden states by transforming the input speech frames;
   generating, by the at least one processor, a current hidden state of a decoder by performing a decoding operation based on a previous embedded label prediction information and a previous attentional hidden state information;
   generating, by the at least one processor, context vectors by computing attention weights based on each of the sequence of encoder hidden states and the current hidden state of the decoder;
   generating, by the at least one processor, a current attentional hidden state based on the context vector and the current hidden state of the decoder; and
   generating, by the at least one processor, an output sequence based on the attentional hidden state.

2. The method of claim 1, wherein the output sequence is a current label prediction information generated by performing a projection and softmax operation based on the attentional hidden state.

3. The method of claim 1, wherein the computing the attention weights further comprises calculating a compatibility score, which represents alignment between the current decoder hidden state and each of the encoded hidden states.

4. The method of claim 3, wherein the computing the attention weights is calculated by the following equation:

$$a_{t,i} = \text{align}(h_i^{dec}, h^{enc}) = \frac{\exp(\text{score}(h_i^{dec}, h_t^{enc}))}{\sum_{t'=1}^{T} \exp(\text{score}(h_i^{dec}, h_{t'}^{enc}))}.$$

5. The method of claim 4,
wherein the score$(h_i^{dec}, h_t^{enc})$=$v_a^{T\circ}$ tanh$(W_a[h_i^{dec}; h_t^{enc}])$,
where [a;b] denotes concatenation of two vectors.

6. The method of claim 1, wherein the context vector, $c_i$ is calculated based on a weighted sum of the sequence of encoder hidden states as follows:

$$c_i = \sum_{t=1}^{T} a_{t,i} h_t^{enc}.$$

7. The method of claim 1, wherein the current attentional hidden state $h'^{dec}_i$ is obtained as follows: $h'^{dec}_i = \tanh(W_h[c_i; h_i^{dec}])$.

8. An end-to-end speech recognition training apparatus comprising:
at least one memory operable to store program code; and
at least one processor operable to read said program code and operate as instructed by said program code, said program code comprising:
receive one or more input speech frames;
generate a sequence of encoder hidden states by transforming the input speech frames;
generate a current hidden state of a decoder by performing a decoding operation based on a previous embedded label prediction information and a previous attentional hidden state information;
generate context vectors by computing attention weights based on each of the sequence of encoder hidden states and the current hidden state of the decoder;
generate a current attentional hidden state based on the context vector and the current hidden state of the decoder; and
generate an output sequence based on the attentional hidden state.

9. The end-to-end speech recognition training apparatus of claim 8, wherein the output sequence is a current label prediction information generated by performing a projection and softmax operation based on the attentional hidden state.

10. The end-to-end speech recognition training apparatus of claim 8, wherein the computing the attention weights further comprises calculating a compatibility score, which represents alignment between the current decoder hidden state and each of the encoded hidden states.

11. The end-to-end speech recognition training apparatus of claim 10, wherein the computing the attention weights is calculated by the following equation:

$$a_{t,i} = \text{align}(h_i^{dec}, h^{enc}) = \frac{\exp(\text{score}(h_i^{dec}, h_t^{enc}))}{\sum_{t'=1}^{T} \exp(\text{score}(h_i^{dec}, h_{t'}^{enc}))}.$$

12. The end-to-end speech recognition training apparatus of claim 11,
wherein the score$(h_i^{dec}, h_t^{enc})$=$v_a^{T\circ}$ tanh$(W_a[h_i^{dec}; h_t^{enc}])$,
where [a;b] denotes concatenation of two vectors.

13. The end-to-end speech recognition training apparatus of claim 8, wherein the context vector, $c_i$ is calculated based on a weighted sum of the sequence of encoder hidden states as follows:

$$c_i = \sum_{t=1}^{T} a_{t,i} h_t^{enc}.$$

14. The end-to-end speech recognition training apparatus of claim 8, wherein the current attentional hidden state $h'^{dec}_i$ is obtained as follows: $h'^{dec}_i = \tanh(W_h[c_i; h_i^{dec}])$.

15. A non-transitory computer readable medium having stored thereon program codes for causing at least one processor to perform a method comprising:
receiving, by the at least one processor, one or more input speech frames;
generating, by the at least one processor, a sequence of encoder hidden states by transforming the input speech frames;
generating, by the at least one processor, a current hidden state of a decoder by performing a decoding operation based on a previous embedded label prediction information and a previous attentional hidden state information;
generating, by the at least one processor, context vectors by computing attention weights based on each of the sequence of encoder hidden states and the current hidden state of the decoder;
generating, by the at least one processor, a current attentional hidden state based on the context vector and the current hidden state of the decoder; and
generating, by the at least one processor, an output sequence based on the attentional hidden state.

16. The non-transitory computer readable medium of claim 15, wherein the output sequent is a current label prediction information generated by performing a projection and softmax operation based on the attentional hidden state.

17. The non-transitory computer readable medium of claim 15, wherein the computing the attention weights further comprises calculating a compatibility score, which represents alignment between the current decoder hidden state and each of the encoded hidden states.

18. The non-transitory computer readable medium of claim 17, wherein the computing the attention weights is calculated by the following equation:

$$a_{t,i} = \text{align}(h_i^{dec}, h^{enc}) = \frac{\exp(\text{score}(h_i^{dec}, h_t^{enc}))}{\sum_{t'=1}^{T} \exp(\text{score}(h_i^{dec}, h_{t'}^{enc}))},$$

wherein the score$(h_i^{dec}, h_t^{enc})$=$v_a^{T\circ}$ tanh$(W_a[h_i^{dec}; h_t^{enc}])$, and
wherein [a;b] denotes concatenation of two vectors.

19. The non-transitory computer readable medium of claim 15, wherein the context vector, $c_i$ is calculated based on a weighted sum of the sequence of encoder hidden states as follows:

$$c_i = \sum_{t=1}^{T} a_{t,i} h_t^{enc}.$$

20. The non-transitory computer readable medium of claim 15, wherein the current attentional hidden state $h'^{dec}_i$ is obtained as follows: $h'^{dec}_i = \tanh(W_h[c_i; h^{dec}_i])$.

* * * * *